(12) United States Patent  (10) Patent No.: US 8,847,993 B2
Shivrastava et al.  (45) Date of Patent: Sep. 30, 2014

(54) RESOLUTION INDEPENDENT EFFECTS IN A GRAPHICS APPLICATION

(75) Inventors: Ajay Shivrastava, Satna (IN); Ashish Duggal, New Delhi (IN); Pushp Parag Agarwal, Ratangarh (IN)

(73) Assignee: Adobe Systems Incorporated, San Jose, CA (US)

( * ) Notice: Subject to any disclaimer, the term of this patent is extended or adjusted under 35 U.S.C. 154(b) by 732 days.

(21) Appl. No.: 12/637,895

(22) Filed: Dec. 15, 2009

(65) Prior Publication Data

US 2013/0141465 A1 Jun. 6, 2013

(51) Int. Cl.
*G06G 5/00* (2006.01)

(52) U.S. Cl.
USPC .......................................................... 345/660

(58) Field of Classification Search
None
See application file for complete search history.

(56) References Cited

U.S. PATENT DOCUMENTS

| | | | |
|---|---|---|---|
| 6,438,575 B1 * | 8/2002 | Khan et al. ................ | 709/200 |
| 6,650,326 B1 * | 11/2003 | Huber et al. ............... | 345/428 |
| 7,283,135 B1 * | 10/2007 | Cote et al. ................. | 345/428 |
| 7,800,636 B2 * | 9/2010 | Sinclair et al. ............. | 345/660 |
| 2002/0158881 A1 * | 10/2002 | vanWelzen ................. | 345/582 |
| 2003/0098862 A1 * | 5/2003 | Hunt et al. ................. | 345/418 |
| 2006/0267982 A1 * | 11/2006 | Aguera y Arcas .......... | 345/428 |
| 2008/0065982 A1 * | 3/2008 | Evanchik et al. .......... | 715/255 |
| 2008/0122864 A1 * | 5/2008 | Utsunomiya et al. ...... | 345/619 |
| 2008/0273218 A1 * | 11/2008 | Kitora et al. ............... | 358/1.13 |
| 2009/0262121 A1 * | 10/2009 | Opala et al. ................ | 345/537 |

* cited by examiner

*Primary Examiner* — Edward Martello
(74) *Attorney, Agent, or Firm* — Kilpatrick Townsend & Stockton LLC

(57) ABSTRACT

Methods and apparatus provide for a Resolution Parameter Modifier. The Resolution Parameter Modifier detects a modification of a document resolution setting from a first resolution to a second resolution. The Resolution Parameter Modifier identifies a resolution dependent parameter(s) associated with a graphical effect(s) applied upon a graphical object(s) in a document, where the graphical object was previously converted from a vector-based object to a raster-based object. The resolution dependent parameter is defined to scale a visual result of the graphical effect with respect to a given document resolution. The Resolution Parameter Modifier updates the resolution dependent parameter in accordance with the second resolution. As the document is rendered at the second resolution, the Resolution Parameter Modifier re-executes the graphical effect on the graphical object in accordance with an updated resolution dependent parameter(s).

20 Claims, 8 Drawing Sheets

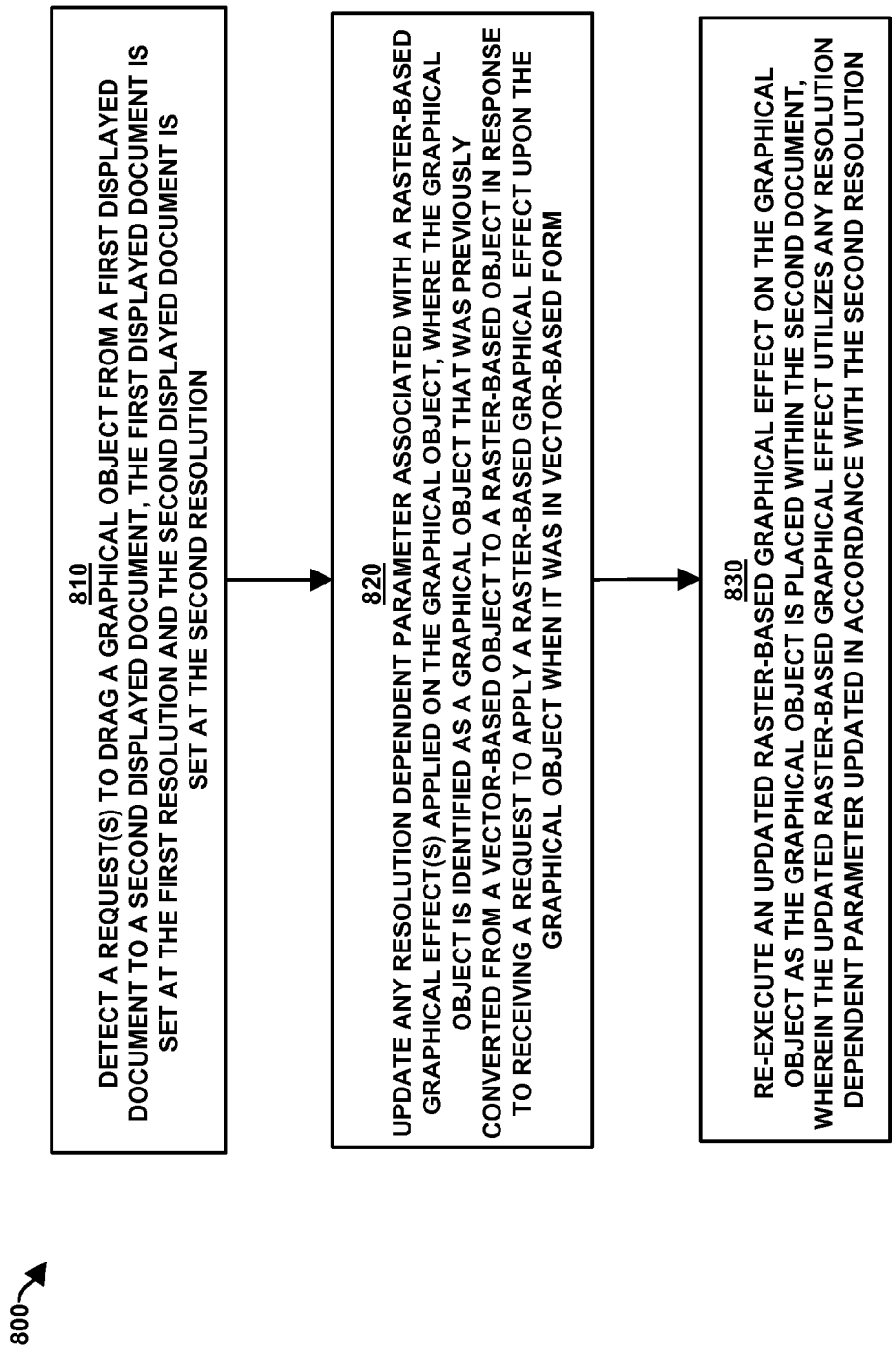

RESOLUTION INDEPENDENT EFFECTS IN A GRAPHICS APPLICATION

BACKGROUND

Conventional design applications are a subclass of application software used for graphic design, multimedia development, specialized image development, image editing, or simply to access graphic files. Conventional design applications utilize either raster or vector graphic reading and editing methods to create, edit, and view digital media (e.g. animations, graphics, images, designs, media objects, etc.). Many conventional design applications, such as graphics programs, focus exclusively on either vector or raster graphics, but there are a few that combine them.

Most conventional design applications have the ability to import and export one or more graphics file formats. Several graphics programs support animation, or digital video. Vector graphics animation can be described as a series of mathematical transformations that are applied in sequence to one or more shapes in a scene. Raster graphics animation works in a similar fashion to film-based animation, where a series of still images produces the illusion of continuous movement.

Some conventional design applications utilize bitmap-based (i.e. raster-based) tools for editing raster-based graphical objects. Other conventional design applications utilize vector-based tools for editing vector-based graphical objects. There are other conventional design applications that can be used for editing both raster-based objects and vector-based objects, and thus utilize both bitmap and vector tools. However, both tools work independently of each other. If the graphical object being edited is raster-based (thereby defined according to a bitmap), the raster-based graphical object can only be edited with bitmap tools. If the graphical object being edited is a vector-based, the vector-based graphical object can only be edited with vector tools. However, often, conventional design applications allow for a raster-based object to be converted to a vector-based object, and—likewise—a vector-based graphical object can also be converted to a raster-based object.

BRIEF DESCRIPTION

Conventional design applications suffer from a variety of deficiencies. In particular, conventional design applications do not ensure that the appearance of a user's graphical design will be maintained as the graphical design is rendered according to different resolutions. In other words, if a user creates a complicated and distinct graphical design in a document by applying a series of graphical effects and design tools—in accordance with a first resolution—a current design application cannot provide the exact same visual appearance of the graphical design in accordance with a second resolution without requiring additional work flow from the user.

In most cases, if the user of a conventional design application wishes to view a graphical design in accordance with different resolutions, the user is required to manually provide new resolution settings for any number of the graphical effects and design tools the user previously selected while creating the graphical design. Requiring manual input of resolution settings for each graphical effect and/or design tool is time consuming, labor intensive, prone for error and can frustrate a user who is not familiar with the various resolution settings editing functions of the current design application.

Another deficiency of conventional design applications is that often a particular graphical effect (when used within a sequence of other graphical effects) can be hidden or obscured—making it even more difficult for the user to even discern which graphical effects require new resolution settings.

In addition, the user may have applied a given graphical effect to both a raster-based object and a vector-based object within the same graphical design. As raster-based objects and vector-based objects have different object type specific parameters, the user cannot be sure that simply changing the resolution settings of the given graphical effect will result in maintaining the visual appearance of both the raster-based object and the vector-based object as the entire graphical design is rendered at a new resolution setting. Thus, the user may be forced to change the graphical design so that all objects that use the given graphical effect are of the same object type.

Techniques discussed herein significantly overcome the deficiencies of conventional design applications such as those discussed above. As will be discussed further, the techniques disclosed herein provide a computer system and/or software in the form of a Resolution Parameter Modifier (e.g. such as a feature within a graphics editor application) that automatically adjusts the respective resolution settings associated with graphical effects and/or design tools used during creation of a graphical design. The Resolution Parameter Modifier described herein thereby maintains the visual appearance of a graphical design, without requiring additional manual user input, as it is rendered according to different resolutions—even if the graphical design contains both raster-based objects and vector-based objects.

For example, whenever a user creates a graphic design, in a document opened via a graphics editing software application, it includes various graphical objects, each graphical object having some document level settings as parameters—such as a resolution parameter based on the resolution at which the document will be rendered. When the user creates a vector-based graphical object and applies a raster-based graphical effect upon the vector-based graphical object, the vector-based graphical object must first be converted to a raster-based graphical object. However, the user has not explicitly requested raster-based conversion.

The vector-based graphical object is thereby implicitly (i.e. automatically) converted into a raster-based graphical object before the raster-based graphical effect is applied upon the graphical object. In addition, the raster-based graphical effect relies on input from the implicit raster-based conversion, where the raster-based conversion utilizes the document level settings native to the document itself. When the document's resolution is changed, the Resolution Parameter Modifier ensures that resolution dependent parameters associated with the raster-based graphical effect are updated in accordance with the document's new resolution setting. Therefore, when the document is rendered at the new resolution settings, the updated resolution dependent parameters (provided by the Resolution Parameter Modifier) ensure that the visual result of the raster-based graphical effect will scale properly—with respect to the new resolution—as the raster-based graphical effect is re-executed.

Specifically, in various embodiments, a computer-implemented system, methods and apparatus provide a Resolution Parameter Modifier (hereinafter "RPM") that detects a modification of a document resolution setting from a first resolution to a second resolution. The Resolution Parameter Modifier identifies a resolution dependent parameter(s) associated with a graphical effect(s) applied upon a graphical object(s) in a document, where the graphical object was previously converted from a vector-based object to a raster-based object. The resolution dependent parameter is defined to scale a visual result of the graphical effect with respect to a given document resolution. The Resolution Parameter Modifier updates the resolution dependent parameter in accordance with the second resolution. As the document is rendered at the second resolution, the Resolution Parameter Modifier re-executes the graphical effect on the graphical object in accordance with an updated resolution dependent parameter(s).

For example, in one embodiment, a graphical object in a document may at one time have been a vector-based object. However, when a user decided to apply a raster-based graphical effect upon the graphical object (when it was in vector-based form), an automatic (i.e. implicit) conversion of the graphical object to a raster-based object occurred. After conversion to raster-based form, the raster-based graphical effect was applied to the graphical object (the graphical object thereby conceptually becoming a "conversion object"). The automatic conversion operation utilized the document's native resolution setting—yet the raster-based graphical effect has its own resolution parameters.

When a request to change the document's resolution is detected by the RPM, the RPM identifies the conversion object as a graphical object that was once in vector-based form, but is presently in raster-based form. The RPM ensures that any resolution dependent parameters associated with the raster-based graphical effect will be updated in accordance with the new resolution. The RPM updates the resolution dependent parameters to ensure that the visual result of the raster-based graphical effect on the conversion object will scale appropriately in accordance with the document's new resolution. As the document's resolution is rendered at a new resolution, the RPM re-executes the raster-based graphical effect on the conversion object utilizing the updated resolution parameters.

It is understood that aspects of the RPM, in different embodiments, are not limited to graphical objects rendering in a document. Rather, aspects of the RPM can be directed towards graphical objects rendered in a graphics editing pane of a graphics design application, a browser, a graphics editing work area, and/or a graphical object embedded within another graphical object.

Other embodiments disclosed herein include software programs to perform the steps and operations summarized above and disclosed in detail below. One such embodiment comprises a computer program product that has a computer-readable medium (e.g., tangible computer-readable medium) including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained as embodiments disclosed herein.

It is to be understood that the system disclosed herein may be embodied strictly as a software program, as software and hardware, or as hardware alone. The embodiments disclosed herein, may be employed in software and hardware such as those manufactured by Adobe Systems Incorporated of San Jose, Calif., U.S.A., herein after referred to as "Adobe" and "Adobe Systems."

Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

Note also that this Brief Description section herein does not specify every embodiment and/or incrementally novel aspect of the present disclosure or claimed invention. Instead, this Brief Description only provides a preliminary discussion of different embodiments and corresponding points of novelty over conventional techniques. For additional details and/or possible perspectives (permutations) of the invention, the reader is directed to the Detailed Description section and corresponding figures of the present disclosure as further discussed below.

BRIEF DESCRIPTION OF THE DRAWINGS

The foregoing and other objects, features and advantages of the invention will be apparent from the following more particular description of embodiments of the methods and apparatus for a Resolution Parameter Modifier, as illustrated in the accompanying drawings and figures in which like reference characters refer to the same parts throughout the different views. The drawings are not necessarily to scale, with emphasis instead being placed upon illustrating the embodiments, principles and concepts of the methods and apparatus in accordance with the invention.

FIG. 8 is a flowchart of an example of processing steps performed by a Resolution Parameter Modifier to execute an updated raster-based graphical effect on a graphical object as the graphical object is dragged from a first document to a second document according to embodiments herein.

DETAILED DESCRIPTION

Figure 1:
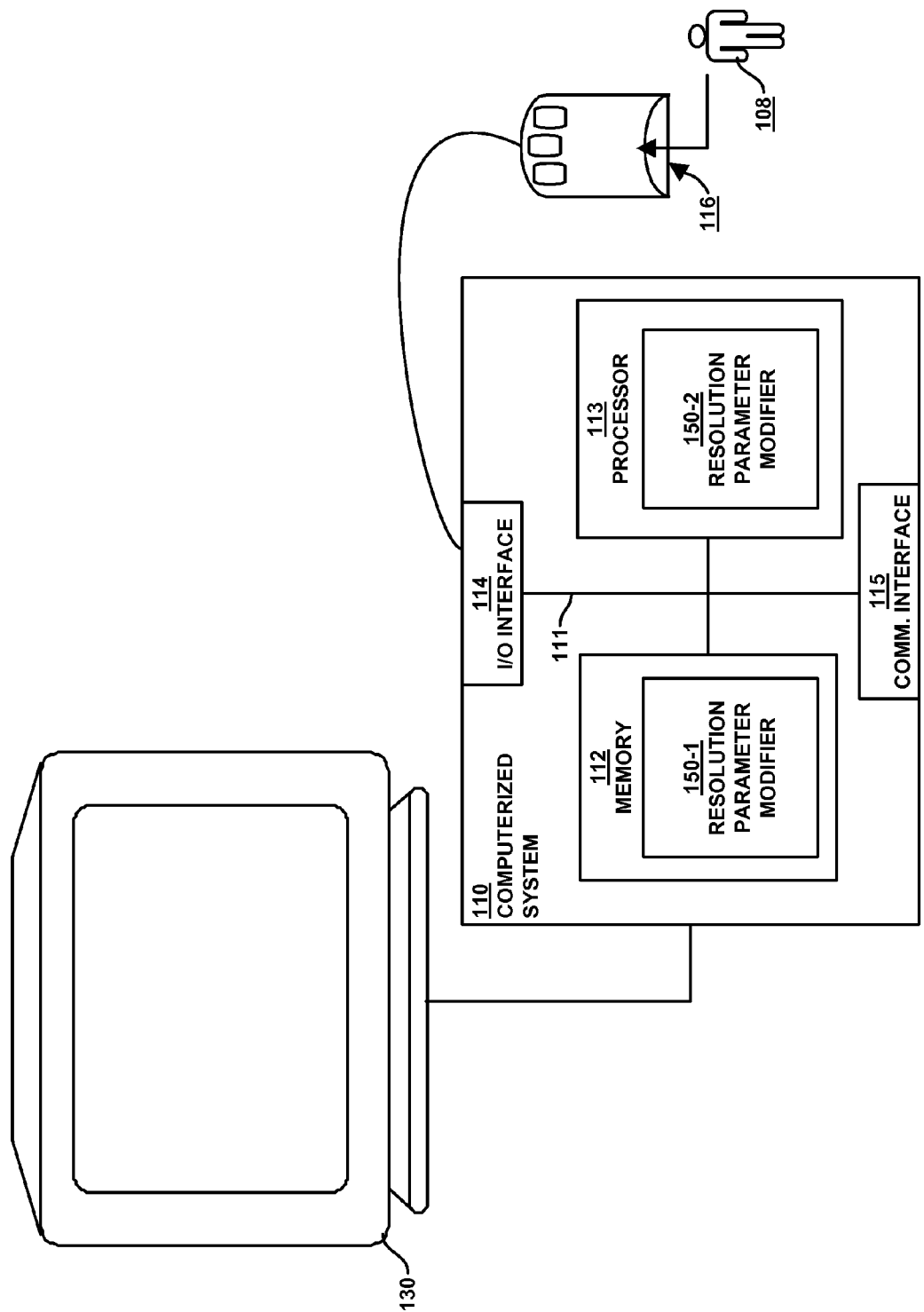
FIG. 1 is an example block diagram illustrating an architecture of a computer system that executes, runs, interprets, operates or otherwise performs a Resolution Parameter Modifier application and/or Resolution Parameter Modifier process according to embodiments herein.

Generally, the techniques disclosed herein provide a computer system and/or software in the form of a Resolution Parameter Modifier (e.g. such as a feature within a graphics editor application) that adjusts the respective resolution settings for all graphical effects and design tools used to create a graphical design. The Resolution Parameter Modifier described herein maintains the visual appearance of a graphical design as it is rendered according to different resolutions—even if the graphical design contains both raster-based objects and vector-based objects.

For example, in one embodiment, a graphical object rendered in a document may at one time have been explicitly converted from a vector-based object to a raster-based object. Such explicit conversion can be, for example, a user manually selecting the graphical object (via an input device) for conversion to a raster-based object (the graphical object thereby conceptually becoming a "conversion object").

When a request to change the document's resolution is detected by the RPM, the RPM identifies the conversion object as a graphical object that was once in vector-based form, but presently in raster-based form. The RPM detects that the conversion object was converted in response to an explicit conversion request—as opposed to an implicit conversion executed in response to application of a raster-based graphical effect on a graphical object (and executed before application of the raster-based graphical effect).

The RPM ensures that any resolution dependent parameters associated with any preceding raster-based graphical effect(s) will be updated in accordance with the new resolution. It is understood that a preceding raster-based graphical effect is a raster-based graphical effect that occurred on the conversion object before the explicit conversion request was received. The RPM updates the resolution dependent parameters to ensure that the visual result of the preceding raster-based graphical effect on the conversion object will scale appropriately in accordance with the document's new resolution.

As the document's resolution is rendered at a new resolution, the RPM re-executes the raster-based graphical effect on the conversion object utilizing the updated resolution parameters. It is understood that, if the RPM detects a plurality of preceding raster-based graphical effects, then the RPM re-executes the "updated" preceding raster-based graphical effects on the conversion object in the same order in which they were originally applied—even if there was a vector-based graphical effect occurring between two preceding raster-based graphical effects.

In another embodiment, the RPM detects that a first conversion object has the same raster-based graphical effect applied on it as a second conversion object in a graphics editing application pane (i.e. work area). The RPM detects the first conversion object was converted into a raster-based graphical object by way of an implicit conversion. In other words, the first conversion object was converted from a vector-based graphical object to a raster-based graphical object when a user applied the raster-based graphical effect while the first conversion object was in vector-based form. A selection of the raster-based graphical effect triggered an automatic conversion into the raster-based graphical object before the application of the raster-based graphical effect.

The RPM detects the second conversion object was converted into a raster-based graphical object by way of an explicit conversion. In other words, the second conversion object was converted from a vector-based graphical object to a raster-based graphical object when a user explicitly requested a conversion to raster-based form. Application of the raster-based graphical effect on the second conversion object is therefore not applied in association with conversion in the raster-based form.

The RPM generates two versions of the raster graphical effect. A first version of the raster-based graphical effect will have updated resolution dependent parameters in accordance with a new document resolution) and a second version of the raster-based graphical effect will maintain the original settings of the raster-based graphical effect. As the RPM renders the document according to the new document resolution, the RPM executes the first version of the raster-based graphical effect on the first conversion object and the RPM executes the second version of the raster-based graphical effect on the second conversion object.

It is understood that a graphical effect can be any software application tool and/or functionality that can enhance, alter and/or construct a graphical object. In addition, a graphical effect can be a user-created graphical effect including user-generated content and a bundle of software application tools and/or functionalities—or any combination thereof. In addition, it is understood that aspects of the Resolution Parameter Modifier, in different embodiments, are not limited to resolution specific parameters. Rather, aspects of the Resolution Parameter Modifier can be directed towards parameters of any document level setting, such as the color model of a document.

FIG. 1 is an example block diagram illustrating an architecture of a computer system 110 that executes, runs, interprets, operates or otherwise performs a Resolution Parameter Modifier application 150-1 and/or Resolution Parameter Modifier process 150-2 (e.g. an executing version of a Resolution Parameter Modifier 150 as controlled or configured by user 108) according to embodiments herein.

Note that the computer system 110 may be any type of computerized device such as a personal computer, a client computer system, workstation, portable computing device, console, laptop, network terminal, etc. This list is not exhaustive and is provided as an example of different possible embodiments.

In addition to a single computer embodiment, computer system 110 can include any number of computer systems in a network environment to carry the embodiments as described herein.

As shown in the present example, the computer system 110 includes an interconnection mechanism 111 such as a data bus, motherboard or other circuitry that couples a memory system 112, a processor 113, an input/output interface 114, and a display 130. If so configured, the display can be used to present a graphical user interface of the Resolution Parameter Modifier 150 to user 108. An input device 116 (e.g., one or more user/developer controlled devices such as a keyboard, mouse, touch pad, etc.) couples to the computer system 110 and processor 113 through an input/output (I/O) interface 114. The computer system 110 can be a client system and/or a server system. As mentioned above, depending on the embodiment, the Resolution Parameter Modifier application 150-1 and/or the Resolution Parameter Modifier process 150-2 can be distributed and executed in multiple nodes in a computer network environment or performed locally on a single computer.

During operation of the computer system 110, the processor 113 accesses the memory system 112 via the interconnect 111 in order to launch, run, execute, interpret or otherwise perform the logic instructions of the Resolution Parameter Modifier application 150-1. Execution of the Resolution Parameter Modifier application 150-1 in this manner produces the Resolution Parameter Modifier process 150-2. In other words, the Resolution Parameter Modifier process 150-2 represents one or more portions or runtime instances of the Resolution Parameter Modifier application 150-1 (or the entire application 150-1) performing or executing within or upon the processor 113 in the computerized device 110 at runtime.

The Resolution Parameter Modifier application 150-1 may be stored on a computer readable medium (such as a floppy disk), hard disk, electronic, magnetic, optical, or other computer readable medium. It is understood that embodiments and techniques discussed herein are well suited for other applications as well.

Those skilled in the art will understand that the computer system 110 may include other processes and/or software and hardware components, such as an operating system. Display 130 need not be coupled directly to computer system 110. For example, the Resolution Parameter Modifier application 150-1 can be executed on a remotely accessible computerized device via the communication interface 115.

Figure 2:
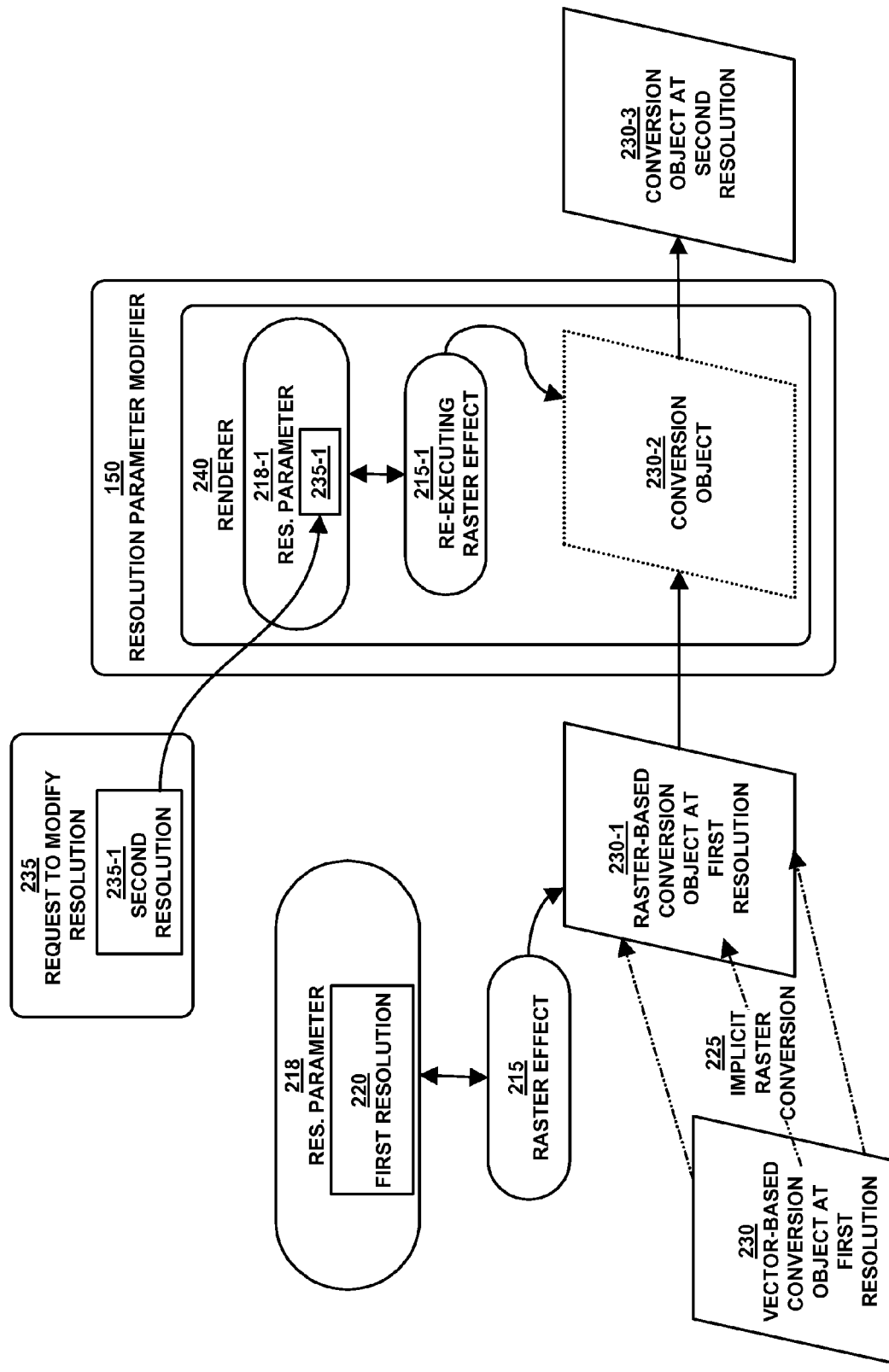
FIG. 2 is an example block diagram of a Resolution Parameter Modifier for updating the resolution dependent parameter(s) of a raster-based graphical effect applied upon a graphical object that was implicitly converted from a vector-based form to a raster-based form according to embodiments herein.

FIG. 2 is an example block diagram of a Resolution Parameter Modifier 150 for updating the resolution dependent parameter(s) of a raster-based graphical effect applied upon a graphical object that was implicitly converted from a vector-based form to a raster-based form according to embodiments herein. The block diagram of FIG. 2 illustrates processing described in the flowcharts 400, 500 provided by FIGS. 4 and 5, respectively. Reference will be made to the block diagram of FIG. 2 as the processing illustrated in flowcharts 400 and 500 is described.

Figure 3:
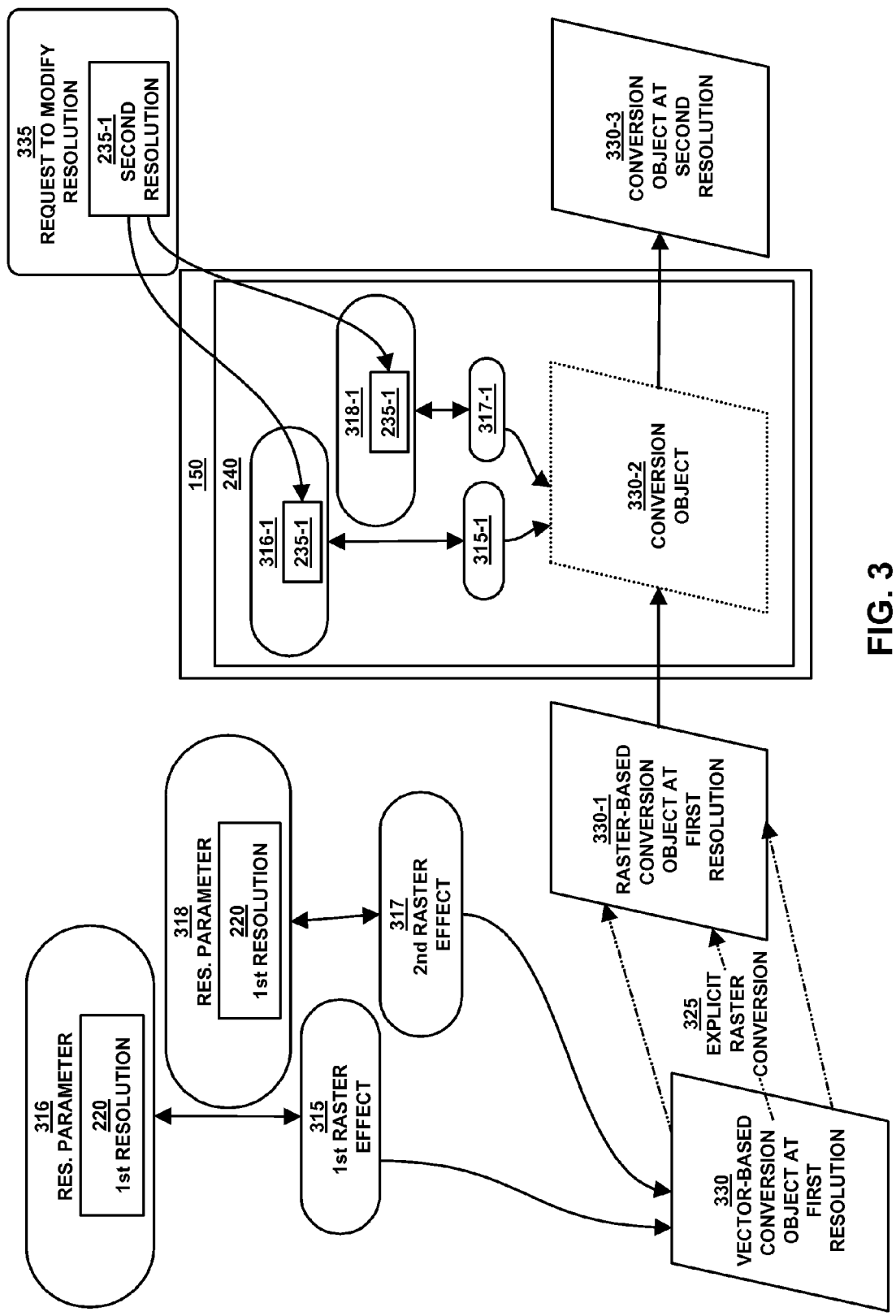
FIG. 3 is an example block diagram of a Resolution Parameter Modifier to updating the resolution dependent parameter(s) of a preceding raster-based graphical effect applied upon a graphical object that was explicitly converted from a vector-based form to a raster-based form according to embodiments herein.

FIG. 3 is an example block diagram of a Resolution Parameter Modifier 150 to updating the resolution dependent parameter(s) of a preceding raster-based graphical effect applied upon a graphical object that was explicitly converted from a vector-based form to a raster-based form according to embodiments herein. The block diagram of FIG. 3 illustrates processing described in the flowcharts 600, 700 provided by FIGS. 6 and 7, respectively. Reference will be made to the block diagram of FIG. 3 as the processing illustrated in flowcharts 600 and 700 is described.

The rectangular elements in flowcharts 400, 500, 600, 700 and 800 (in FIGS. 4, 5, 6, 7 and 8, respectively) denote "processing blocks" and represent computer software instructions or groups of instructions upon a computer readable medium. Additionally, the processing blocks represent steps performed by hardware such as a computer, digital signal processor circuit, application specific integrated circuit (ASIC), etc. As the processing in the flowcharts is described, reference will be made to FIGS. 2 and 3.

Flowcharts 400, 500, 600, 700 and 800 do not necessarily depict the syntax of any particular programming language. Rather, flowcharts 400, 500, 600, 700 and 800 illustrate the functional information one of ordinary skill in the art requires to fabricate circuits or to generate computer software to perform the processing required in accordance with the present invention.

It will be appreciated by those of ordinary skill in the art that unless otherwise indicated herein, the particular sequence of steps described is illustrative only and may be varied without departing from the spirit of the invention. Thus, unless otherwise stated, the steps described below are unordered, meaning that, when possible, the steps may be performed in any convenient or desirable order.

Figure 4:
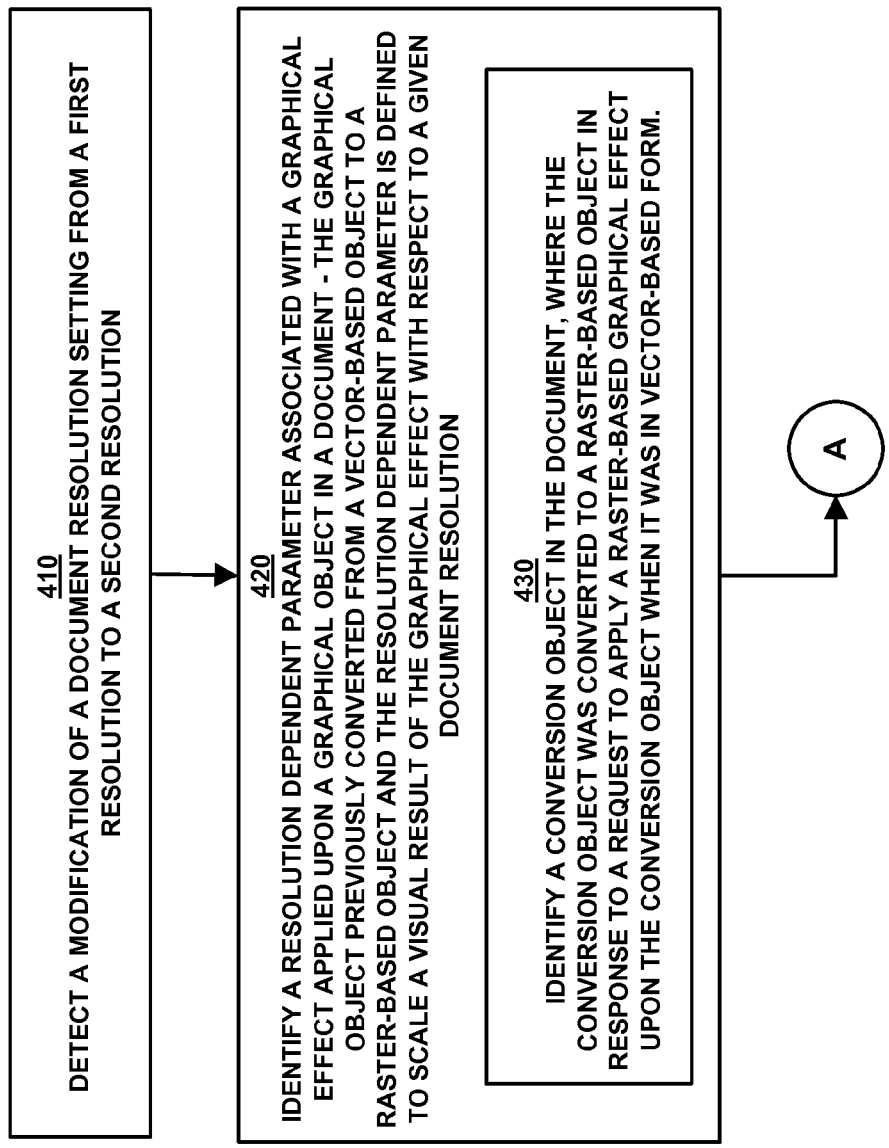
FIG. 4 is a flowchart of an example of processing steps performed by a Resolution Parameter Modifier to identify an implicitly converted graphical object according to embodiments herein.

Turning now to FIG. 4, flowchart 400 illustrates an example of processing steps performed by a Resolution Parameter Modifier 150 to identify an implicitly converted graphical object according to embodiments herein. As discussed, reference will be made to the block diagram of FIG. 2 as the processing of the flowchart 400 is described.

At step 410, the RPM 150 detects a modification of a document resolution setting from a first resolution 220 to a second resolution 235-1. For example, the RPM 150 receives a request 235 to render a conversion object 230-1 at the second resolution 235-1, where the conversion object 230-1 is currently rendered at the first resolution 220. It is understood that the conversion object 230-1 could be included within a document(s)—along with other vector-based graphical objects and raster-based graphical objects.

At step 420, the RPM 150 identifies a resolution dependent parameter 218 associated with a graphical effect 215 applied upon a graphical object 230-1 in a document.

At step 430, the RPM 150 identifies a conversion object 230-1 in the document, where the conversion object 230-1 was converted to a raster-based object in response to a request to apply a raster-based graphical effect 215 upon the conversion object 230 when it was in vector-based form. For example, the graphical object 230-1 was previously converted from a vector-based conversion object 230 to a raster-based conversion object 230-1. The raster-based conversion 225 was implicit, in that it was invoked in response to a request to apply a raster-based graphical effect 215 on the vector-based conversion object 230. The implicit raster conversion 225 was executed prior to application of the raster-based graphical effect—which resulted in a created a raster-based conversion object 230-1, at the first resolution 220, modified according to the raster-based graphical effect 215. The raster-based graphical effect 215 was applied in accordance with a resolution dependent parameter 218 set at the first resolution 220.

Figure 5:
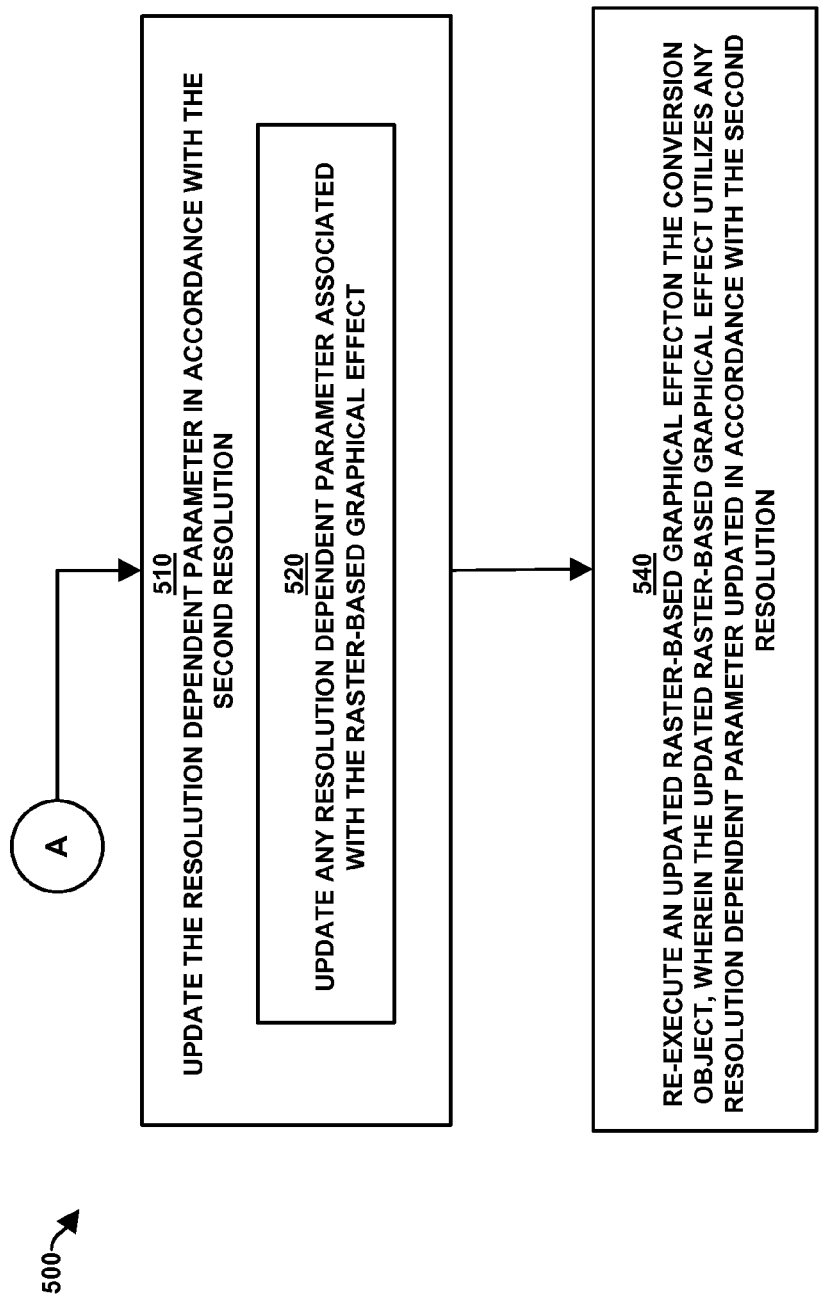
FIG. 5 is a flowchart of an example of processing steps performed by a Resolution Parameter Modifier to update the resolution dependent parameters of a graphical effect according to embodiments herein.

FIG. 5 is a flowchart 500 of an example of processing steps performed by a Resolution Parameter Modifier 150 to update the resolution dependent parameters of a graphical effect according to embodiments herein. Again, reference will be made to the block diagram of FIG. 2 as the processing of the flowchart 500 is described.

At step 510, the RPM 150 updates the resolution dependent parameter 218-1 in accordance with the second resolution 235-1. Specifically, at step 520, the RPM 150 updates any resolution dependent parameter 218 associated with the raster-based graphical effect 215. For example, the RPM 150 detects the request 235 to change the resolution and extracts the new resolution settings (i.e. the second resolution 235-1) from the request 235. The RPM 150 updates the resolution dependent parameter 218 with the data based on the second resolution 235-1.

At step 530, the RPM 150 re-executes an updated raster-based graphical effect 215-1, via a renderer 240, on the conversion object 230-2, wherein the updated raster-based graphical effect 215-1 utilizes any resolution dependent parameter 218-1 updated in accordance with the second resolution 235-1. Upon completion of a rendering process performed by the renderer 240, the RPM 150 creates a conversion object 230-3 rendered at the second resolution 235-1.

It is understood that the RPM 150 can re-execute multiple updated raster-based graphical effects on multiple, respective graphical objects within a document—concurrently or according to a particular order.

Figure 6:
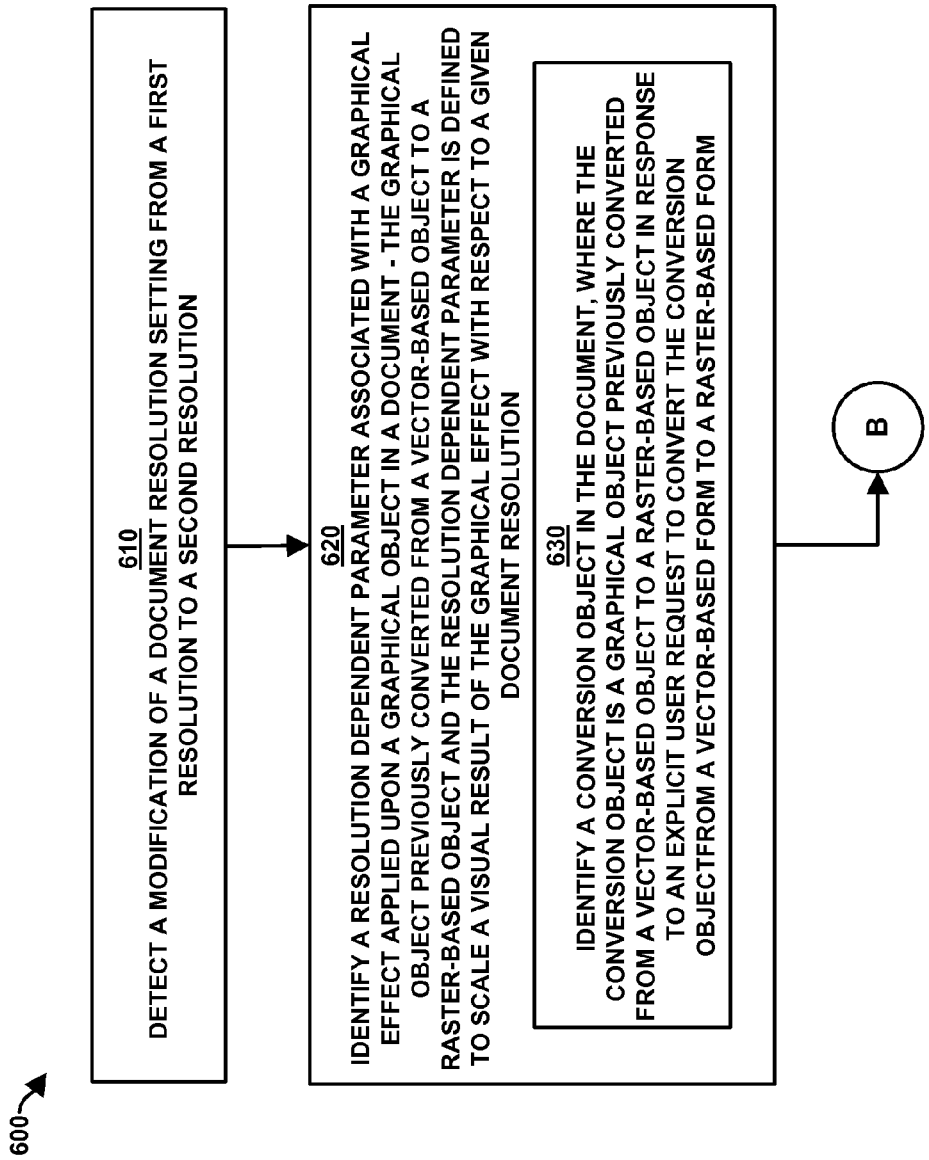
FIG. 6 is a flowchart of an example of processing steps performed by a Resolution Parameter Modifier to identify an explicitly converted graphical object according to embodiments herein.

FIG. 6 is a flowchart 600 of an example of processing steps performed by a Resolution Parameter Modifier 150 to identify an explicitly converted graphical object according to embodiments herein. Reference will be made to the block diagram of FIG. 3 as the processing of the flowchart 600 is described.

At step 610, the RPM 150 detects a modification of a document resolution setting from a first resolution 220 to a second resolution 235-1. For example, the RPM 150 receives a request 335 to modify a resolution from the first resolution 220 to the second resolution 235-1.

At step 620, the RPM 150 identifies resolution dependent parameters 316, 318 associated with a graphical effect 315, 317 applied upon a graphical object 330 in a document. For example, the RPM 150 identifies two previous raster-based graphical effects 315, 317, each having its own corresponding resolution dependent parameter(s) 316, 318.

At step 630, the RPM 150 identifies a conversion object 330-1 in the document, where the conversion object 330-1 is a graphical object previously converted from a vector-based object 330 to a raster-based object 330-1 in response to an explicit user request to convert the conversion object 330 from a vector-based form to a raster-based form 330-1.

Figure 7:
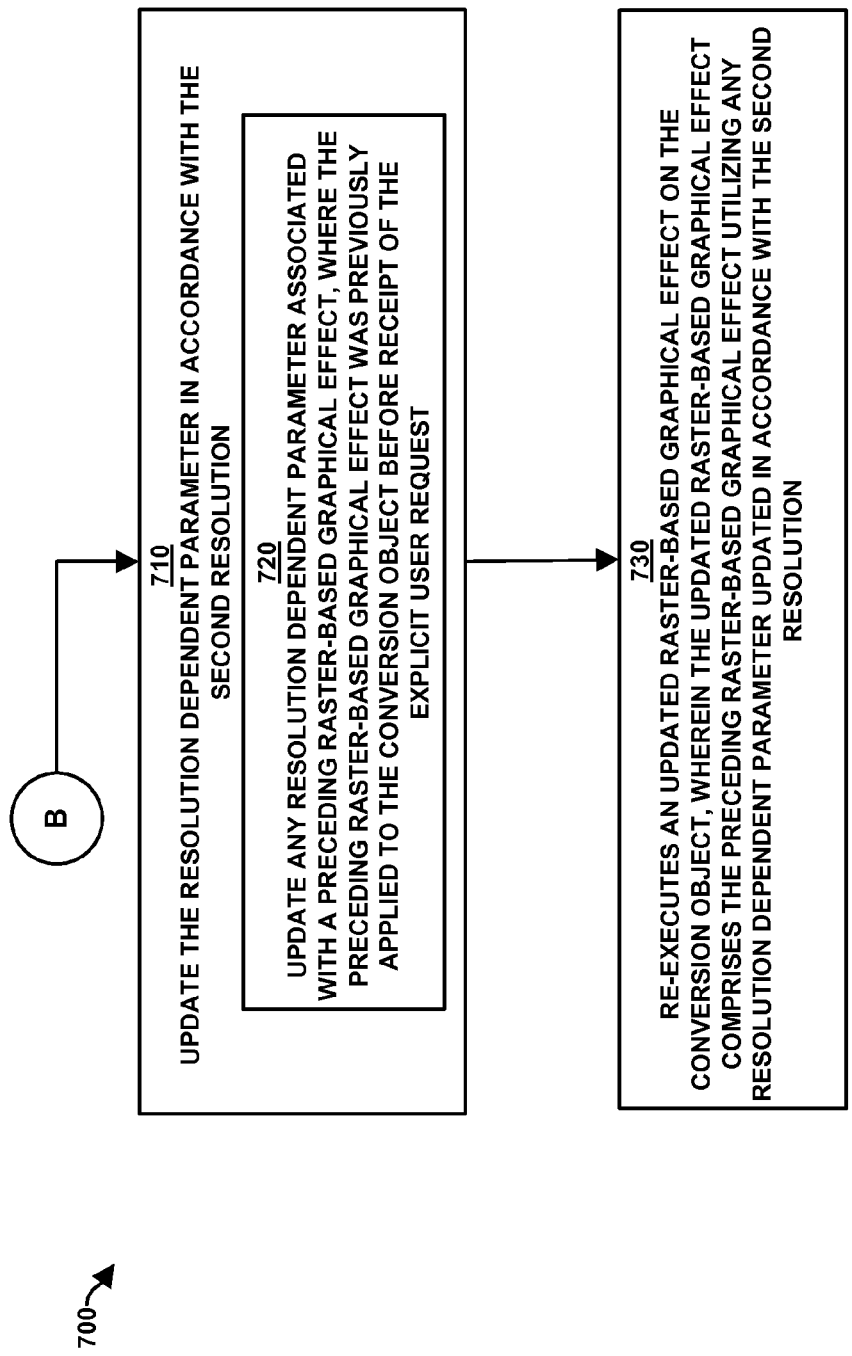
FIG. 7 is a flowchart of an example of processing steps performed by a Resolution Parameter Modifier to update the resolution dependent parameters of a preceding graphical effect according to embodiments herein.

FIG. 7 is a flowchart 700 of an example of processing steps performed by a Resolution Parameter Modifier 150 to update the resolution dependent parameters of a conversion object according to embodiments herein. Reference will be made to the block diagram of FIG. 3 as the processing of the flowchart 700 is described.

At step 710, the RPM 150 updates the resolution dependent parameters 316, 318 in accordance with the second resolution 235-1. Specifically, at step 720, the RPM 150 updates any resolution dependent parameters 316, 318 associated with preceding raster-based graphical effects 315, 317, where the preceding raster-based graphical effects 315, 317 were previously applied to the conversion object 330 before receipt of the explicit user request that invoked the raster conversion 325.

At step 730, the RPM 150 re-executes an updated raster-based graphical effect(s) 315-1, 317-1 on the conversion object 330-2 as it is processed in the renderer 240, wherein the updated raster-based graphical effect(s) 315-1, 317-1 comprises the preceding raster-based graphical effect(s) 315, 317 utilizing any resolution dependent parameters 316-1, 318-1 updated in accordance with the second resolution 235-1. It is noted that the second resolution 235-1 was acquired by the RPM 150 via extraction from the request 335 to modify the resolution. Upon completion of a rendering process performed by the renderer 240, the RPM 150 creates a conversion object 330-3 rendered at the second resolution 235-1.

It is understood the RPM 150 re-executes the updated raster-based graphical effects 315-1, 317-1 on the conversion object 330-2 in the same order (i.e. sequence) at which they were applied on the conversion object 330 prior to the explicit raster conversion 325. In addition, if any type of intermediary graphical effect(s) was applied in between the preceding raster-based graphical effects 315, 317, the RPM 150 re-executes the intermediary graphical effect(s) as well in proper order with the updated raster-based graphical effects 315-1, 317-1.

FIG. 8 is a flowchart 800 of an example of processing steps performed by a Resolution Parameter Modifier 150 to execute an updated raster-based graphical effect on a graphical object as the graphical object is dragged from a first document to a second document according to embodiments herein.

At step 810, the RPM 150 detects a request(s) to drag the graphical object from a first displayed document to a second displayed document. The first displayed document is set at the first resolution and the second displayed document is set at the second resolution.

At step 820, the RPM 150 updates any resolution dependent parameter(s) associated with a raster-based graphical effect(s) applied on the graphical object, where the graphical object is identified, by the RPM 150, as a graphical object that was previously converted from a vector-based object to a raster-based object in response to receiving a request to apply a raster-based graphical effect upon the graphical object when it was in vector-based form.

It is noted that the raster-based graphical effect includes user-generated content. In addition, application of the raster-based graphical effect implicitly included converting the graphical object into the raster-based object (i) prior to application of the raster-based graphical effect and (ii) without receiving an explicit user request to convert the graphical object.

At step 830, the RPM 150 re-executes an updated raster-based graphical effect on the graphical object as the graphical object is placed within the second document, wherein the updated raster-based graphical effect utilizes at least one resolution dependent parameter updated in accordance with the second resolution.

It is noted, for purposes of this document, that "re-executing an updated raster-based graphical effect" can be interpreted, in various embodiments, to describe that a raster-based graphical effect—that was previously applied to a graphical object (or conversion object)—is being executed on the graphical object (or conversion object) with updated resolution parameters.

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer(s), notebook computer(s), workstation(s) (e.g., Sun, HP), personal digital assistant(s) (PDA(s)), handheld device(s) such as cellular telephone(s), laptop(s), handheld computer(s), camera(s), camcorder(s), television set-top box(es) or another device(s) capable of being integrated with a processor(s) that may operate as provided herein. Accordingly, the devices provided herein are not exhaustive and are provided for illustration and not limitation.

References to "a processor", or "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A computer-implemented method comprising:
detecting, by a computing device, a modification of a resolution setting from a first resolution to a second resolution;
identifying a resolution dependent parameter associated with a user-created raster-based graphical effect, the resolution dependent parameter defined to scale a visual result of the user-created raster-based graphical effect with respect to a given resolution, wherein the user-created raster-based graphical effect includes user-generated content and is executable on a graphical object;
in response to receiving a request to apply the raster-based graphical effect to the graphical object when the graphical object is in a vector-based form, executing the raster-based graphical effect by implicitly converting the graphical object into the raster-based form prior to applying the raster-based graphical effect without receiving an explicit request to convert the graphical object;
updating, by the computing device, the resolution dependent parameter in accordance with the second resolution; and
re-executing the raster-based graphical effect on the graphical object to render the graphical object as a raster-based object in accordance with the updated resolution dependent parameter.

2. The computer-implemented method as in claim 1, wherein the user-created raster-based graphical effect is re-executed on the graphical object prior to rendering the graphical object as the raster-based object.

3. The computer-implemented method as in claim 1, wherein identifying the resolution dependent parameter includes identifying the graphical object in a document, and wherein the request to apply the raster-based graphical effect includes an explicit user request to convert the graphical object from the vector-based form to a raster-based form.

4. The computer-implemented method as in claim 3, wherein updating the resolution dependent parameter in accordance with the second resolution includes updating a resolution dependent parameter associated with a preceding raster-based graphical effect, the preceding raster-based graphical effect applied to the graphical object before receipt of the explicit user request.

5. The computer-implemented method as in claim 4, wherein executing the raster-based graphical effect on the graphical object comprises executing the preceding raster-based graphical effect utilizing the updated resolution dependent parameter associated with the preceding raster-based graphical effect.

6. The computer-implemented method as in claim 4, wherein executing the updated raster-based graphical effect on the graphical object includes:
executing a plurality of raster-based graphical effects on the graphical object according to a sequence, the sequence comprising an order in which corresponding preceding raster-based graphical effects were applied prior to receiving the explicit user request.

7. The computer-implemented method as in claim 1, wherein:
detecting a modification of the resolution setting from a first resolution to a second resolution includes detecting a request to drag the graphical object from a first displayed document to a second displayed document, the first displayed document set at the first resolution, the second displayed document set at the second resolution;
updating the resolution dependent parameter includes updating the resolution dependent parameter associated with the raster-based graphical effect applied to the graphical object in response to a request to apply the raster-based graphical effect to the graphical object when it was in the vector-based form;
and
re-executing the graphical effect on the graphical object includes executing an updated raster-based graphical effect on the graphical object as the graphical object is placed within the second document, wherein the updated raster-based graphical effect utilizes the resolution dependent parameter updated in accordance with the second resolution.

8. The computer-implemented method as in claim 1, wherein the user-created raster-based graphical effect is re-executed on the graphical object as the graphical object is rendered at the second resolution by the computing device.

9. The computer-implemented method as in claim 1, wherein the user-created raster-based graphical effect includes one or more functionalities of a software application executing on the computing device.

10. A non-transitory computer readable storage medium having executable instructions stored thereon, that if executed by a computerized device, cause the computerized device to perform processing, the instructions comprising:
   instructions for detecting a modification of a document resolution setting from a first resolution to a second resolution;
   instructions for identifying a resolution dependent parameter associated with a user-created raster-based graphical effect, the resolution dependent parameter defined to scale a visual result of the user-created raster-based graphical effect with respect to a given resolution, wherein the user-created raster-based graphical effect includes user-generated content and is executable on a graphical object;
   in response to receiving a request to apply the raster-based graphical effect to the graphical object when the graphical object is in a vector-based form, instructions for executing the raster-based graphical effect by implicitly converting the graphical object into the raster-based form prior to applying the raster-based graphical effect without receiving an explicit request to convert the graphical object;
   instructions for updating the resolution dependent parameter in accordance with the second resolution;
   instructions for re-executing the raster-based graphical effect on the graphical object to render the graphical object as a raster-based object in accordance with the updated resolution dependent parameter.

11. The computer readable storage medium as in claim 10, wherein the instructions for re-executing the user-created raster-based graphical effect comprise instructions for re-executing the user-created raster-based graphical effect prior to rendering the graphical object as the raster-based object.

12. The computer readable storage medium as in claim 11, wherein the instructions for identifying the resolution dependent parameter include instructions for identifying the graphical object in a document, and wherein the request to apply the raster-based graphical effect includes an explicit user request to convert the graphical object from the vector-based form to a raster-based form.

13. The computer readable storage medium as in claim 12, wherein the instructions for updating the resolution dependent parameter in accordance with the second resolution include:
   instructions for updating a resolution dependent parameter associated with a preceding raster-based graphical effect, the preceding raster-based graphical effect applied to the graphical object before receipt of the explicit user request.

14. The computer readable storage medium as in claim 13, wherein the instructions for re-executing the raster-based graphical effect include:
   instructions for executing an updated raster-based graphical effect on the graphical object as the document is rendered at the second resolution, wherein the updated raster-based graphical effect comprises the preceding raster-based graphical effect utilizing the updated resolution dependent parameter associated with the preceding raster-based graphical effect.

15. The computer readable storage medium as in claim 13, wherein the instructions for re-executing the raster-based graphical effect include:
   instructions for executing a plurality of updated raster-based graphical effects on the graphical object according to a sequence, the sequence comprising an order in which corresponding preceding raster-based graphical effects were applied prior to receiving the explicit user request.

16. The computer readable storage medium as in claim 10, wherein:
   the instructions for detecting a modification of a document resolution setting from a first resolution to a second resolution include instructions for detecting a request to drag the graphical object from a first displayed document to a second displayed document, the first displayed document set at the first resolution, the second displayed document set at the second resolution;
   the instructions for updating the resolution dependent parameter include instructions for updating the resolution dependent parameter associated with the raster-based graphical effect applied to the graphical object in response to a request to apply the raster-based graphical effect to the graphical object when it was in the vector-based form; and
   the instructions for re-executing the graphical effect and executing the raster-based graphical effect include instructions for implicitly converting the graphical object into the raster-based form without receiving an explicit request to convert the graphical object, as the graphical object is placed within the second document.

17. A computer system comprising:
   a processor;
   a memory unit that stores instructions associated with an application executable by the processor; and
   an interconnect coupling the processor and the memory unit, the interconnect enabling the computer system to execute the application and perform operations of:
      detecting a modification of a document resolution setting from a first resolution to a second resolution;
      identifying a resolution dependent parameter associated with a user-created raster-based graphical effect, the resolution dependent parameter defined to scale a visual result of the user-created raster-based graphical effect with respect to a given document resolution, wherein the user-created raster-based graphical effect includes user-generated content and is executed on a graphical object in response to a request to apply the raster-based graphical effect to the graphical object, wherein the request is received when the graphical object was in a vector-based form, and wherein executing the raster-based graphical effect includes implicitly converting the graphical object into the raster-based form prior to applying the raster-based graphical effect without receiving an explicit request to convert the graphical object;
      updating the resolution dependent parameter in accordance with the second resolution; and
      re-executing the raster-based graphical effect on the graphical object to render the graphical object as a raster-based object, the re-executing utilizing the updated resolution dependent parameter.

18. The computer system as in claim 17, wherein:

detecting a modification of a document resolution setting from a first resolution to a second resolution includes detecting a request to drag the graphical object from a first displayed document to a second displayed document, the first displayed document set at the first resolution, the second displayed document set at the second resolution;

application of the raster-based graphical effect includes implicitly converting the graphical object from the vector-based form to the raster-based form without receiving an explicit request to convert the graphical object; and re-executing the raster-based graphical effect on the graphical object is performed as the graphical object is placed within the second document.

19. A method comprising:

receiving a request to change a resolution of a document from a first resolution to a second resolution, the document comprising a graphical object having a vector-based form;

identifying a graphical effect applied upon the graphical object;

identifying a user-created raster-based graphical effect including user-generated content and to be applied to the graphical object in response to a request to apply the user-created raster-based graphical effect to the graphical object;

in response to receiving a request to apply the raster-based graphical effect when the graphical object is in a vector-based form, executing the raster-based graphical effect by implicitly converting the graphical object into the raster-based form prior to applying the raster-based graphical effect without receiving an explicit request to convert the graphical object;

identifying a resolution dependent parameter associated with the graphical effect and the raster-based graphical effect, the resolution dependent parameter defined to scale a visual result of the graphical effect and the raster-based graphical effect with respect to a given resolution;

updating the resolution dependent parameter in accordance with the second resolution; and re-executing, using the updated resolution dependent parameter, the graphical effect on the graphical object and executing the raster-based graphical effect on the graphical object to render the graphical object in a raster-based form.

20. The method of claim 19, wherein the user-created raster-based graphical effect is re-executed on the graphical object as the document is rendered on a display of a computing device at the second resolution.

* * * * *